Patented Apr. 29, 1947

2,419,816

UNITED STATES PATENT OFFICE 2,419,816

METHOD OF PREPARING AQUEOUS DISPERSIONS OF SYNTHETIC RESINS

Charles F. Brown, Middlebury, Conn., assignor, by mesne assignments, to United States Rubber Company, New York, N. Y., a corporation of New Jersey No Drawing. Application October 20, 1944, Serial No. 559,651

20 Claims. (Cl. 260—23)

This invention relates to a method of preparing aqueous dispersions of certain synthetic resins, more particularly aqueous dispersions of certain synthetic resins on soaps as the dispersing agents.

Natural rubber, as is known, may readily be dispersed in water by milling or otherwise plasticizing the rubber, incorporating a hydrophilic colloidal dispersing agent, for example soap, solubilized casein, or colloidal clay, and adding water while stretching and kneading the plasticized mass, as in an internal mixer, such as Werner & Pfleiderer type mixer, until an inversion of phase takes place, and the rubber becomes dispersed in the aqueous medium. Gums, bitumens, and cellulose esters have been similarly dispersed in water. Many synthetic resins, even after the addition of conventional plasticizing agents, cannot be dispersed in water with soap as the dispersing agent because such synthetic resins are resistant to and will not absorb soap-forming acids or soaps in such a manner that the addition of water thereto, as in an internal mixer, will cause an inversion of phase and dispersion of the synthetic resin in the aqueous medium. In these cases, the synthetic resin containing the soap breaks up in small pieces on addition of the water and the soap merely exudes to the surface of the pieces of synthetic resin.

By the present invention, aqueous dispersions of certain synthetic resins may readily be prepared with soaps as the dispersing agents.

In carrying out my invention, the heat-reaction product of rosin, an alkanolamine, a glycol, and a dimerized acid of a vegetable drying oil is mixed with the synthetic resin before dispersing the resin on the soap. This reaction product acts to improve the receptiveness of the synthetic resin to soap, whereby after the soap is milled in, water may be added as in an internal mixer until inversion of phase readily takes place and the synthetic resin becomes dispersed, together with the added heat-reaction product, in the aqueous medium containing the soap. The heat-reaction product of rosin, an alkanolamine, a glycol, and a dimerized acid of a vegetable drying oil, and the method of preparing the same, is disclosed in my copending application Serial No. 507,295, filed October 22, 1943. As disclosed in that case, the glycol and dimerized acid of a vegetable drying oil may first be reacted to form a so-called polyester which itself is a known commercial synthetic resin, sold under the trade names Norepol and Agripol. The polyester, or the glycol and dimerized acid of a vegetable drying oil, is reacted at elevated temperatures with rosin and an alkanolamine to form the heat-reaction product which is used in the present invention to aid in dispersing certain difficultly dispersible synthetic resins in water. Examples of the preparation of the heat-reaction product, according to my prior patent application Serial No. 507,295, are given below.

The heat-reaction product may be produced by heating for about 5 to 15 hours at a temperature from about 180° C. to 300° C., a mix containing rosin, an alkanolamine, a glycol and a dimerized acid of a vegetable drying oil, or an equivalent mix containing rosin, an alkanolamine and a polyester. The alkanolamine may be a mono- or di- or tri-substituted alkanolamine, or a mixture thereof, e. g., monoethanolamine, diethanolamine, triethanolamine, although the tri-substituted alkanolamines are preferred. The term "polyester" refers to the synthetic resin obtained by reacting a glycol with a dimerized acid of a vegetable drying oil, such as soy bean oil, tung oil, linseed oil, or other unsaturated vegetable oil acid. By "dimerized" is meant the combination of two molecules of the unsaturated acid by addition polymerization. These are the conventional meanings of the terms.

The reactions taking place between the components present are varied and complex. The polyester when added as such probably breaks down into its several reacting groups, which groups or bodies react with other bodies present to give various products differing from the original reactants. The dimerized acid and glycol, when added separately, either provide such reactive groups, or may react to give a polyester, which in turn may give up reactive bodies as postulated. The dimerized acid and glycol, when added separately, should be added to a weight equivalent to the weight of the polyester. For example, 87.5 parts of dimerized acids of soy bean oil, and 12.5 parts of ethylene glycol, are equivalent to 100 parts of the corresponding polyester. In some cases, an excess of the glycol may be used beyond that entering into combination. As such, the glycol seems to act as a plasticizer and does not materially change the basic heat-reaction product or resin formed. The proportion of the reactants may be varied over a wide range and they may be admixed with other materials before, during, or after the reaction; for example, a polyvinyl acetal resin may be additionally added. Proportions, by weight, are exemplified by the following:

| | Parts |
|---|---|
| Rosin | 25-100 |
| Triethanolamine | 25-100 |
| Polyester | 50-200 |

Preferred proportions, by weight, as illustrated by the examples below, comprise about equal parts of the rosin (or its equivalent of abietic acid) and the ethanolamine, together with from about 85 to about 100 parts of the polyester based on each 100 parts of the rosin.

The following Examples I to IV, in which the parts are by weight, are given in illustration of the invention:

Example I

| | Parts |
|---|---|
| Rosin | 100 |
| Triethanolamine | 100 |
| Polyester | 100 |

The "polyester" and that of Example II is a combination prepared from a dimerized acid derived from such as soy bean oil, said dimerized acid being reacted with ethylene glycol and the reaction product containing about 12½% ethylene glycol. It is sold under the trade name "Norepol."

The rosin and the amine are mixed and heated to about 180° C. until the ingredients form a homogeneous solution. Then the polyester is added and the reaction mixture is heated together in a suitable container at 200-230° C. for about 9 or 10 hours, or until incipient gelling takes place. At the indication of gelling, the mixture is dumped from the reaction vessel and allowed to cool. The product is a dark, very sticky, adhesive, gel-like resin that is insoluble in all of the common solvents, except the benzenoid and chlorinated hydrocarbons.

Example II

The reaction product may be further modified by the incorporation of other resins. These resins serve to add strength to the composition and do not materially change the properties of the basic heat-reaction product. A preferred mixture is:

| | Parts |
|---|---|
| Rosin | 100 |
| Triethanolamine | 100 |
| Polyester | 85 |
| Polyvinyl butyral resin | 15 |

The reaction mixture is heated as in Example I. The product has characteristics substantially identical with that cited in Example I except that the composition is stiffer and stronger.

Example III

It is not always necessary that the polyester be added as such. The ingredients may be added separately. The following example is illustrative:

| | Parts |
|---|---|
| Rosin | 100 |
| Triethanolamine | 100 |
| Dimerized acid | 87.25 |
| Ethylene glycol | 12.75 |

The "dimerized acid" and that of Example IV corresponds to the dimerized unsaturated long chain fatty acid or acids such as those derived from soy bean oil. The reactants are heated together as in Example I and the heat-reaction product has characteristics equivalent to that of Example I.

Example IV

A heat-reaction product corresponding to that produced in Example II is obtained from:

| | Parts |
|---|---|
| Rosin | 100 |
| Triethanolamine | 100 |
| Dimerized acids | 74.4 |
| Ethylene glycol | 10.6 |
| Polyvinyl butyral resin | 15 |

The reactants are heated together as in Example II, and the products obtained are substantially identical in characteristics with those from Example II.

Products such as the above and illustrated in previous Examples I to IV, will be termed heat-reaction products of rosin, an alkanol amine, a glycol and a dimerized acid of a vegetable drying oil, or a dimerized unsaturated acid of a vegetable oil. Such resinous heat-reaction products may readily be milled into synthetic resins. With certain synthetic resins, the heat-reaction product will permit the admixture of soaps with the synthetic resin mass and give an inversion of phase on addition of water with dispersing of the synthetic resin and added heat-reaction product in the aqueous medium. The amount of the heat-reaction product added to the synthetic resin is not critical, additions of from 5 to 50 parts of the heat-reaction product of the above examples per 100 parts of synthetic resin effectively aiding the dispersing of the synthetic resin in water. In general, increased amounts of the heat-reaction product give increased viscosities, and increased tack to films laid down from the dispersions.

Synthetic resins which have been dispersed in water on soap as the dispersing agent with the aid of the above heat-reaction products are polymers of butadienes-1,3, copolymers of butadienes-1,3 with other polymerizable compounds, polyisobutylene, copolymers of isobutylene and a small amount of a conjugated diene, organic polysulfide polymers, polyvinylchloride, copolymers of vinyl chloride and vinyl acetate, and alkyl methacrylate polymers. It may be necessary or advisable in many cases to incorporate conventional plasticizers in the synthetic resin before dispersing. The applicant has not succeeded in dispersing polyvinyl acetate or polystyrene on soap by the method of the present invention.

Illustrative of polymers of butadienes-1,3 are the polymers of butadiene-1,3, methyl-2-butadiene-1,3 (isoprene), chloro-2-butadiene-1,3 (chloroprene), piperylene, and 2,3-dimethylbutadiene-1,3. Illustrative of the copolymers of butadienes-1,3 with other polymerizable compounds which are capable of forming copolymers with butadienes-1,3, are copolymers of the above illustrated butadienes-1,3 with compounds which contain a $CH_2=C<$ group where at least one of the disconnected valences is attached to an electroactive group, that is, a group which substantially increases the electrical dissymmetry of polar character of the molecule. Examples of such compounds which contain a $CH_2=C<$ group and are copolymerizable with butadienes-1,3 are aryl olefins, such as styrene and vinyl naphthalene, the alpha-methylene carboxylic acids, and their esters, nitriles and amides, such as acrylic acid, methyl acrylate, methyl methacrylate, acrylonitrile, methacrylonitrile, methacrylamide; methyl vinyl ether; methyl vinyl ketone; vinylidene chloride. Examples of commercial synthetic rubbers which are polymers of copolymers of butadienes-1,3 as above are neoprene or GRM rubber (polymerized chloro-2-butadiene-1,3), Buna S or GRS rubber (copolymer of butadiene-1,3 and styrene), and Buna N or GRN rubber (copolymer of butadiene and acrylonitrile). Polyisobutylene is commercially known as Vistanex. Illustrative of copolymers of isobutylene with a small amount of a conjugated diene, are copolymers of isobutylene with 1 to 10% of butadiene-1,3 or methyl-2-butadiene-1,3 (isoprene). These are known as Butyl or GRI rubbers. Illustrative of synthetic rubbers which are organic polysulphide polymers are the commercial "Thiokols" which are substantially polymers of the structural unit

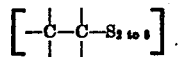

or the structural unit

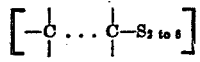

where

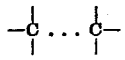

represents two carbon atoms separated by and joined to an intervening structure such as an ether linkage, unsaturated carbon atoms, aromatic structure, saturated straight chain hydrocarbons, or saturated branch chain hydrocarbons as described in the Patrick Patents Nos. 1,890,191 and 2,216,044, where, for example, alkali polysulphides are made to react on such compounds as ethylene dichloride and dichlorethyl ether, respectively.

The following examples are illustrative of the preparation of aqueous dispersions of various synthetic resins according to the present invention utilizing the heat-reaction products of prior Examples I to IV as dispersing aids for the synthetic resins prior to dispersing on soap. In some cases the heat-reaction product itself sufficiently plasticizes the synthetic resin before dispersion, whereas in other cases, the synthetic resin should additionally be plasticized with a conventional plasticizer for the synthetic resin in a known manner, before dispersing the synthetic resin. The soap may be added as such or formed in-situ in the synthetic resin mass. The soap may be a conventional soap dispersing agent, such as an alkali-metal, ammonium, alkylamine, alkanolamine, or morpholine soap. All parts in the following examples are by weight.

*Example V*

100 parts of commercial neoprene (polymerized chloro-2-butadiene-1,3) were mixed on a mill with 15 parts of the heat-reaction product of Example I. To the thus plasticized neoprene was added 1 part of oleic acid and 1 part of water, whereupon the batch was transferred to a Werner & Pfleiderer mixer and 4 more parts of oleic acid added. 1.25 parts of potassium hydroxide dissolved in a small amount of water were added to saponify the oleic acid and form the potassium soap in situ. Water was then added slowly and inversion of phase took place after the total addition of about 25 parts of water, whereupon the neoprene became dispersed in the water. Further water was added to the desired concentration of 60% solids.

Compounding and modifying ingredients, such as other resins, fillers, curatives, pigments, loading materials and the like, may be added to the plasticized mix on the mill or in the Werner & Pfleiderer mixer prior to addition of water to inversion of phase, as in the case of dispersions of natural rubber.

*Example VI*

100 parts of commercial Buna S rubber (copolymer of butadiene and styrene) were mixed on a mill with 15 parts of the heat-reaction product of Example II. This batch was placed in a Werner & Pfleiderer mixer and 8 parts of stearic acid were added together with a small amount of water followed by 2 parts of potassium hydroxide dissolved in a small amount of water to form the soap. Water was then added to inversion of phase.

*Example VII*

100 parts of commercial Buna N (copolymer of butadiene and acrylonitrile) were mixed on a mill with 25 parts of the heat-reaction product of Example IV. 6 parts of oleic acid and a small amount of water were added, after which the mass was transferred to a Werner & Pfleiderer mixer where 1.3 parts of sodium hydroxide dissolved in a small amount of water were mixed in. Water was then slowly added with continuous kneading and stretching of the mass in the mixer until an inversion of phase took place and the Buna N rubber became dispersed in the aqueous medium.

*Example VIII*

100 parts of commercial Vistanex (polyisobutylene) was mixed on a rubber mill with 15 parts of the heat-reaction product of Example II above. One part of stearic acid and 1 part of water were added on the mill. The mill batch was then placed in a Werner & Pfleiderer mixer and 5 parts more of stearic acid added. After thorough incorporation of the stearic acid, a small amount of water was added with 1.5 parts of potassium hydroxide dissolved in a small amount of water to saponify the stearic acid and form the potassium soap in situ. Water was then added slowly to inversion of phase.

*Example IX*

100 parts of commercial Butyl rubber (copolymer of isobutylene with about 1 to 2% isoprene) were mixed on a mill with 20 parts of the heat-reaction product of Example III. The plasticized mass was transferred to a Werner & Pfleiderer mixed where 6 parts of stearic acid were added with continuous mixing together with a small amount of water followed by 1.3 parts of sodium hydroxide dissolved in a small amount of water to form the sodium soap. Water was then added with continuous kneading and stretching of the mass in the mixer in the usual manner until inversion of phase took place and a stable aqueous dispersion was obtained.

*Example X*

100 parts of commercial Thiokol (organic polysulphide polymer formed by the reaction between sodium polysulphide and dichlorethyl ether) were mixed on a mill with 15 parts of the heat-reaction product of Example II. 6 parts of oleic acid and a small amount of water were added to the Thiokol batch. The mass was then transferred to a Werner & Pfleiderer mixer where 1.3 parts of sodium hydroxide dissolved in a small amount of water were added to form the soap, after which water was slowly added with continuous stretching and kneading in the mixer until an inversion of phase took place.

Example XI 100 parts of polyvinyl chloride were placed in a Werner & Pfleiderer type mixer. There was added 100 parts of dibutoxyethylphthalate, a conventional plasticizer, and 15 parts of the heat-reaction product of Example II. The batch was plasticized in the mixer until the mass was homogeneous. To the plasticized batch was added 8 parts of oleic acid which was well worked into the mix. 2.5 parts of potassium hydroxide dissolved in a small amount of water were added to form the soap, after which water was slowly added with continuous stretching and kneading until inversion in phase took place and the desired concentration between 50 and 60% solids was obtained.

Example XII

Copolymers of vinyl chloride and vinyl acetate having weight ratios of vinyl chloride to vinyl acetate of about 85:15 (commercial Vinylite VYNS) and about 95:5 (commercial Vinylite VYNW) were each dispersed in the same manner as the polyvinyl chloride in Example XI. The Vinylites were also dispersed in a manner similarly to the polyvinyl chloride in Example XI but using dibutyl sebacate and tricresyl phosphate as conventional plasticizers instead of the dibutoxyethyl phthalate plasticizer.

Example XIII

Butyl methacrylate polymer and butyl-isobutyl methacrylate polymer were each dispersed in the same manner as the polyvinyl chloride in Example XI.

Example XIV

This case illustrates the dispersing of a mixture of synthetic resins according to the present invention.

100 parts of polyvinyl chloride were placed in an internal mixer of the Werner & Pfleiderer type, and 100 parts of dibutyl phthalate plasticizer were added. 30 parts of a copolymer of butadiene-1,3 and acrylonitrile (commercial Hycar OR-15) and 15 parts of the heat-reaction product of Example II was added, and the batch was plasticized in the mixer until the mass was homogeneous. To the batch was then added 5 parts of oleic acid which was well worked into the mix followed by 2 parts of potassium hydroxide dissolved in a small amount of water. Water was then added slowly until inversion in phase took place followed by additional water to the desired concentration of 50-60% solids.

Examples V to XIV disclose the dispersion of various synthetic resins according to the present invention using soap as the dispersing agent, soap dispersions being the most difficult dispersions of synthetic resins to prepare due to the resistance of the synthetic resins to the softening effects of soap-forming acids and soaps. However, the heat reaction products such as shown in Examples I to IV, will effectively aid in the dispersing of the synthetic resins on other dispersing agents than soaps, such as proteins, for example solubilized casein, or colloidal clay.

In view of the many changes and modifications that may be made without departing from the principles underlying the invention, reference should be made to the appended claims for an understanding of the scope of the protection afforded the invention.

Having thus described my invention, what I claim and desire to protect by Letters Patent is:

1. The method of preparing an aqueous dispersion of synthetic resin selected from the group consisting of polyvinyl chloride, and copolymers of vinyl chloride and vinyl acetate, and alkyl methacrylate polymers, which comprises mixing with such synthetic resin a plasticizer therefor, a heat-reaction product, at a temperature in the range of between about 180° C. and 300° C., of a mix containing rosin, an alkanolamine, an alkylene glycol and a dimerized acid of a vegetable drying oil, and also mixing with the synthetic resin a hydrophilic colloidal dispersing agent selected from the group consisting of soaps, proteins, solubilized casein and colloidal clay, and adding water until an inversion of phase takes place.

2. The method of preparing an aqueous dispersion of synthetic resin selected from the group consisting of polyvinyl chloride, and copolymers of vinyl chloride and vinyl acetate, and alkyl methacrylate polymers, which comprises mixing with such synthetic resin a plasticizer therefor, a heat-reaction product, at a temperature in the range of between about 180° C. and 300° C., of a mix containing rosin, an alkanolamine, ethylene glycol and a dimerized acid of a vegetable drying oil, and also mixing with the synthetic resin a soap, and adding water until an inversion of phase takes place.

3. The method of preparing an aqueous dispersion of synthetic resin selected from the group consisting of polyvinyl chloride, and copolymers of vinyl chloride and vinyl acetate, and alkyl methacrylate polymers, which comprises mixing with such synthetic resin a plasticizer therefor, a heat-reaction product, at a temperature in the range of between about 180° C. and 300° C., of a mix containing rosin, an alkanolamine, ethylene glycol and dimerized acid of soy bean oil, and also mixing with the synthetic resin a hydrophilic colloidal dispersing agent selected from the group consisting of soaps, proteins, solubilized casein and colloidal clay, and adding water until an inversion of phase takes place.

4. The method of preparing an aqueous dispersion of synthetic resin selected from the group consisting of polyvinyl chloride, and copolymers of vinyl chloride and vinyl acetate, and alkyl methacrylate polymers, which comprises mixing with such synthetic resin a plasticizer therefor, a heat-reaction product, at a temperature in the range of between about 180° C. and 300° C., of a mix containing rosin, an alkanolamine, an alkylene glycol and dimerized acid of soy bean oil, and also mixing with the synthetic resin a soap, and adding water until an inversion of phase takes place.

5. The method of preparing an aqueous dispersion of an alkyl methacrylate polymer which comprises mixing with said polymer a plasticizer therefor, a heat-reaction product, at a temperature in the range of between about 180° C. and 300° C., of a mix containing rosin, an alkanolamine, an alkylene glycol and a dimerized acid of a vegetable drying oil, and also mixing with said polymer a hydrophilic colloidal dispersing agent selected from the group consisting of soaps, proteins, solubilized casein and colloidal clay, and adding water until an inversion of phase takes place.

6. The method of preparing an aqueous dispersion of an alkyl methacrylate polymer which comprises mixing with said polymer a plasticizer therefor, a heat-reaction product, at a temperature in the range of between about 180° C. and 300° C., of a mix containing rosin, an alkanolamine, ethylene glycol and dimerized acid of soy bean oil, and also mixing with said polymer a soap, and adding water until an inversion of phase takes place.

7. The method of preparing an aqueous dispersion of polyvinyl chloride which comprises mixing with said polyvinyl chloride a plasticizer therefor, a heat-reaction product, at a temperature in the range of between about 180° C. and 300° C., of a mix containing rosin, an alkanolamine, an alkylene glycol and a dimerized acid of a vegetable drying oil, and also mixing with said polyvinyl chloride a hydrophilic colloidal dispersing agent selected from the group consisting of soaps, proteins, solubilized casein and colloidal clay, and adding water until an inversion of phase takes place.

8. The method of preparing an aqueous dispersion of polyvinyl chloride which comprises mixing with said polyvinyl chloride a plasticizer therefor, a heat-reaction product, at a temperature in the range of between about 180° C. and 300° C., of a mix containing rosin, an alkanolamine, ethylene glycol and dimerized acid of soy bean oil, and also mixing with said polyvinyl chloride a soap, and adding water until an inversion of phase takes place.

9. The method of preparing an aqueous dispersion of a copolymer of vinyl chloride and vinyl acetate which comprises mixing with said copolymer a plasticizer therefor, a heat-reaction product, at a temperature in the range of between about 180° C. and 300° C., of a mix containing rosin, an alkanolamine, an alkylene glycol and a dimerized acid of a vegetable drying oil, and also mixing with said copolymer a hydrophilic colloidal dispersing agent selected from the group consisting of soaps, proteins, solubilized casein and colloidal clay, and adding water until an inversion of phase takes place.

10. The method of preparing an aqueous dispersion of a copolymer of vinyl chloride and vinyl acetate which comprises mixing with said copolymer a plasticizer therefor, a heat-reaction product, at a temperature in the range of between about 180° C. and 300° C., of a mix containing rosin, an alkanolamine, ethylene glycol and dimerized acid of soy bean oil, and also mixing with said copolymer a soap, and adding water until an inversion of phase takes place.

11. A composition of matter containing dispersed particles of a mixture of synthetic resin selected from the group consisting of polyvinyl chloride, and copolymers of vinyl chloride and vinyl acetate, and alkyl methacrylate polymers, with a plasticizer therefor, and a heat-reaction product, at a temperature in the range of between about 180° C. and 300° C., of a mix containing rosin, an alkanolamine, an alkylene glycol and a dimerized acid of a vegetable drying oil, in an aqueous medium containing a hydrophilic colloidal dispersing agent selected from the group consisting of soaps, proteins, solubilized casein and colloidal clay.

12. A composition of matter containing dispersed particles of a mixture of synthetic resin selected from the group consisting of polyvinyl chloride, and copolymers of vinyl chloride and vinyl acetate, and alkyl methacrylate polymers, with a plasticizer therefor, and a heat-reaction product, at a temperature in the range of between about 180° C. and 300° C., of a mix containing rosin, an alkanolamine, ethylene glycol and a dimerized acid of a vegetable drying oil, in an aqueous medium containing soap.

13. A composition of matter containing dispersed particles of a mixture of synthetic resin selected from the group consisting of polyvinyl chloride, and copolymers of vinyl chloride and vinyl acetate, and alkyl methacrylate polymers, with a plasticizer therefor, and a heat-reaction product, at a temperature in the range of between about 180° C. and 300° C., of a mix containing rosin, an alkanolamine, ethylene glycol and dimerized acid of soy bean oil, in an aqueous medium containing a hydrophilic colloidal dispersing agent selected from the group consisting of soaps, proteins, solubilized casein and colloidal clay.

14. A composition of matter containing dispersed particles of a mixture of synthetic resin selected from the group consisting of polyvinyl chloride, and copolymers of vinyl chloride and vinyl acetate, and alkyl methacrylate polymers, with a plasticizer therefor, and a heat-reaction product, at a temperature in the range of between about 180° C. and 300° C., of a mix containing rosin, an alkanolamine, an alkylene glycol and dimerized acid of soy bean oil, in an aqueous medium containing soap.

15. A composition of matter containing dispersed particles of a mixture of an alkyl methacrylate polymer with a plasticizer therefor, and a heat-reaction product, at a temperature in the range of between about 180° C. and 300° C., of a mix containing rosin, an alkanolamine, ethylene glycol and dimerized acid of soy bean oil, in an aqueous medium containing a hydrophilic colloidal dispersing agent selected from the group consisting of soaps, proteins, solubilized casein and colloidal clay.

16. A composition of matter containing dispersed particles of a mixture of an alkyl methacrylate polymer with a plasticizer therefor, and a heat-reaction product, at a temperature in the range of between about 180° C. and 300° C., of a mix containing rosin, an alkanolamine, an alkylene glycol and a dimerized acid of a vegetable drying oil, in an aqueous medium containing soap.

17. A composition of matter containing dispersed particles of a mixture of polyvinyl chloride with a plasticizer therefor, and a heat-reaction product, at a temperature in the range of between about 180° C. and 300° C., of a mix containing rosin, an alkanolamine, ethylene glycol and dimerized acid of soy bean oil, in an aqueous medium containing a hydrophilic colloidal dispersing agent selected from the group consisting of soaps, proteins, solubilized casein and colloidal clay.

18. A composition of matter containing dispersed particles of a mixture of polyvinyl chloride with a plasticizer therefor, and a heat-reaction product, at a temperature in the range of between about 180° C. and 300° C., of a mix containing rosin, an alkanolamine, an alkylene glycol and a dimerized acid of a vegetable drying oil, in an aqueous medium containing soap.

19. A composition of matter containing dispersed particles of a mixture of a copolymer of vinyl chloride and vinyl acetate with a plasticizer therefor and a heat-reaction product, at a temperature in the range of between about 180° C. and 300° C., of a mix containing rosin, an alkanolamine, ethylene glycol and dimerized acid of soy bean oil, in an aqueous medium containing a hydrophylic colloidal dispersing agent selected from the group consisting of soaps, proteins, solubilized casein and colloidal clay.

20. A composition of matter containing dispersed particles of a mixture of a copolymer of vinyl chloride and vinyl acetate with a plasticizer therefor and a heat-reaction product, at a temperature in the range of between about 180° C. and 300° C., of a mix containing rosin, an alkanolamine, an alkylene glycol and a dimerized acid of a vegetable drying oil, in an aqueous medium containing soap.

CHARLES F. BROWN.